Sept. 30, 1924.  
S. T. WALKUP  
AUTOMOBILE TREAD  
Filed Oct. 20, 1921

1,510,251

Inventor  
Samuel Thomas Walkup

Patented Sept. 30, 1924.

1,510,251

UNITED STATES PATENT OFFICE.

SAMUEL THOMAS WALKUP, OF NEW YORK, N. Y.

AUTOMOBILE TREAD.

Application filed October 20, 1921. Serial No. 509,121.

*To all whom it may concern:*

Be it known that I, SAMUEL THOMAS WALKUP, a citizen of the United States, and resident of New York city, in the county of New York and State of New York, have invented certain new and useful Automobile Treads, of which the following is a specification.

This invention relates to means for widening the ground-engaging surface of a large segment of the periphery of an automobile wheel whereby passing safely over ice or mud is facilitated.

An object of my invention is to provide means for increasing the tread or ground-engaging surface of automobile wheels by which the wheels of a stalled automobile can be removed from a mud or ice hole.

A further object of my invention is to provide means by which an automobile can be prevented from skidding.

A further object of my invention is to assist an automobile to travel over snow and ice.

My invention is illustrated by the accompanying drawings forming part of this application in which.

Figure 1:
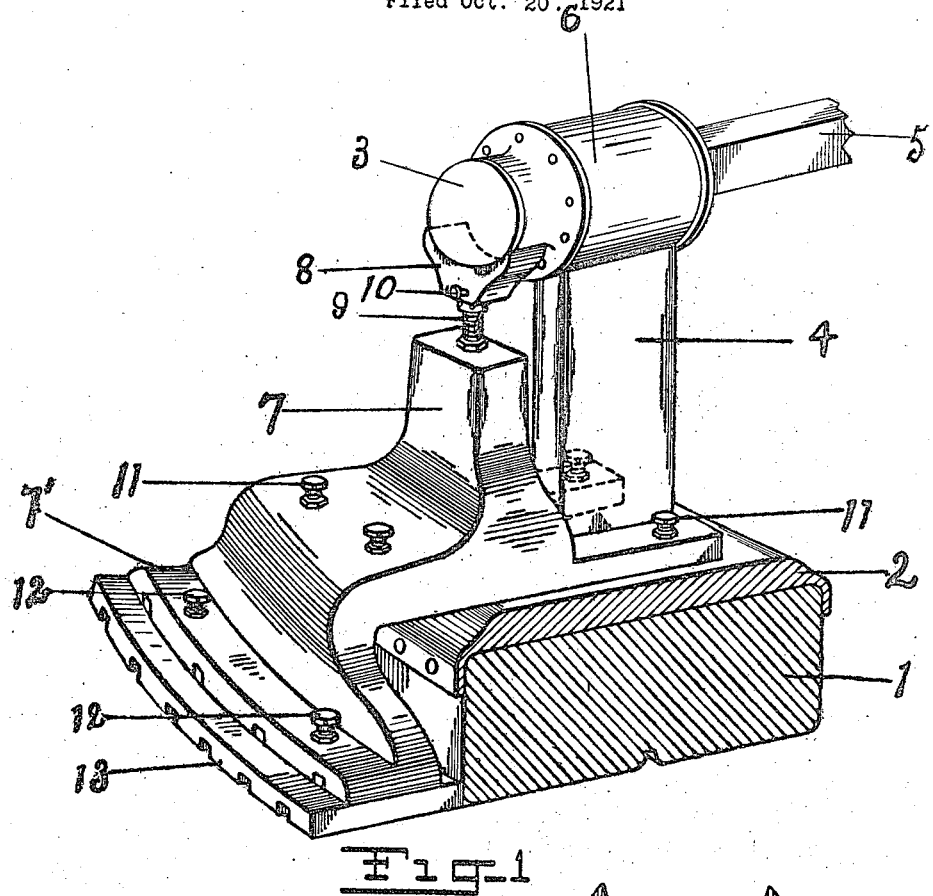
Figure 1, is a perspective view showing my tread adjusted to part of automobile wheel.
Figure 2:
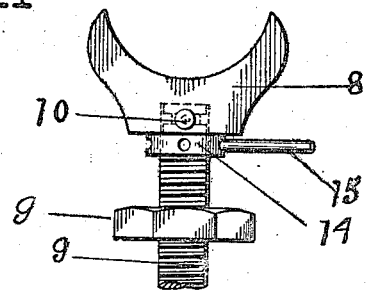
Figure 2, is a detail view showing a portion of the device adjacent to the hub of an automobile wheel.

These figures show a portion of a truck wheel, 1 representing a solid rubber tire, 2 a rim, 4 a spoke, 6 a hub, and 3 a hub cap borne by a portion of the hub which projects outwardly from the general plane of the wheel. Upon the outer face of the wheel is secured a rigid member 7 extending radially outward from a point near the hub and having a plate-like projection which rests upon the inner face of the rim and is slotted or forked to embrace the spoke and which member extends outward with respect to the wheel's axis alongside the lateral margin of the rim and terminates in a heavy cylindrical flange 7' curved about the wheel's axis and projecting laterally with respect to the plane of the wheel to give additional tread surface, its peripheral face being transversely grooved.

A block 8 rests against the projecting part of the hub and a screw 9 rotates without advance in a recess in the block, being held in place by a small screw 10. The screw 9 is in threaded engagement with the member 7 and is rotated by a bar 15 inserted in a hole in a head 14. By rotating the screw 9, the block may be pressed against the hub, and the member 7 pressed against the rim with great force and the member be thus locked in place. This locking is aided by screws 11 working in the member 7 and pressing against the inner and outer portions of the rim, and these screws, like the screw 9, are locked against accidental rotation by common lock-nuts.

When a still wider tread surface is desired, a thick, similarly grooved and curved plate 13 is added, being rigidly held by screws 12 which are also locked like those before mentioned.

Obviously, for use on sandy or yielding earth the added tread surface is not necessarily flush with the normal tread surface of the wheel, but for running on ice or the like the surfaces should be flush, as they are shown, when the plate 13 is in place. It is also plain that the angular or circumferential extent of the added surface is not necessarily as shown, nor is it essential that the tire and rim be of the forms illustrated so long as they are within the scope of the claims which are found allowable.

Having thus described my invention what I claim as new, and desire to secure by Letters Patent is:

1. The combination with a wheel, of a tread-widening member rigidly and removably fixed to the wheel by frictional engagement with both the hub and rim and having a laterally projecting portion alongside the tread and extending through a large fraction of the tread's annular extent, there being no positive engagement of said member with either hub or rim; whereby the wheel may at will be provided with an unusually extensive traction and bearing surface.

2. The combination with a wheel having a hub and a rim, of an extensible member interposed between the hub and rim, and means for forcibly extending said member radially to lock it to the hub and rim, said member having a broad cylindrically curved lateral flange extending for a material annular distance alongside the tread of the wheel, increasing the traction and bearing surface.

3. The combination with a wheel hub, spokes, and rim, of a plate in frictional contact with the inner face of the rim and forked to embrace a spoke, a block resting against the hub, a screw pressing oppositely against the hub and plate, and screws working in the plate and engaging the surface of the rim to aid in resisting relative movement of the two parts, said plate having alongside the rim a cylindrical rigidly connected tread flange extending laterally from the plane of the wheel.

In witness whereof, I have signed my name to this specification in the presence of subscribing witnesses.

SAMUEL THOMAS WALKUP.

Witnesses:
A. F. WORTMAN,
FREDERICK STEFFENS.